March 19, 1935.  G. C. CLARK  1,994,571

APPARATUS FOR MOLDING SECTIONS OF AN ARTICULATED MEMBER

Filed Feb. 3, 1934   5 Sheets-Sheet 1

INVENTOR.
George C. Clark.
BY
ATTORNEY.

March 19, 1935. G. C. CLARK 1,994,571
APPARATUS FOR MOLDING SECTIONS OF AN ARTICULATED MEMBER
Filed Feb. 3, 1934 5 Sheets-Sheet 2

INVENTOR.
George C. Clark.
BY
ATTORNEY.

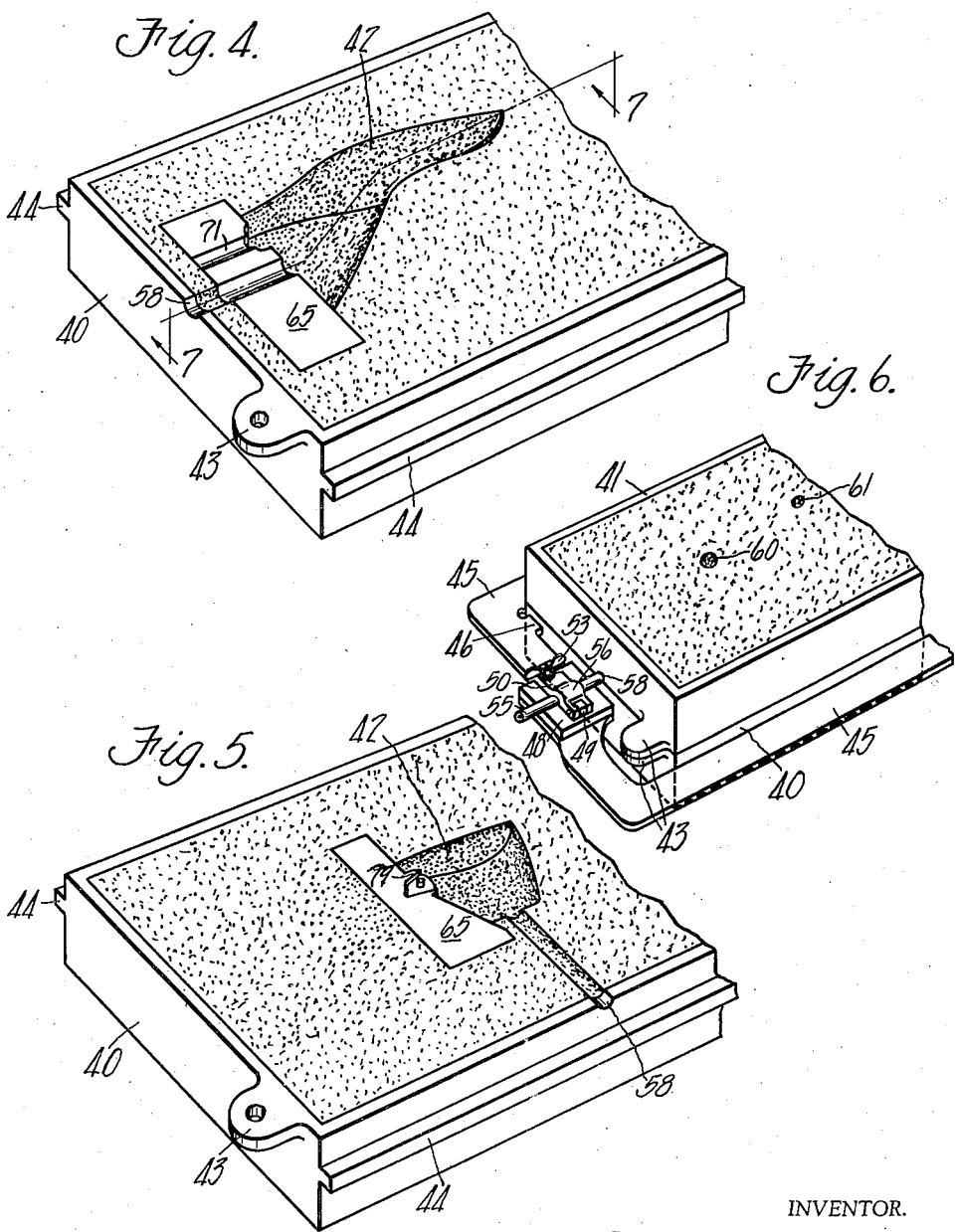

March 19, 1935.　　　　G. C. CLARK　　　　1,994,571
APPARATUS FOR MOLDING SECTIONS OF AN ARTICULATED MEMBER
Filed Feb. 3, 1934　　　5 Sheets-Sheet 4
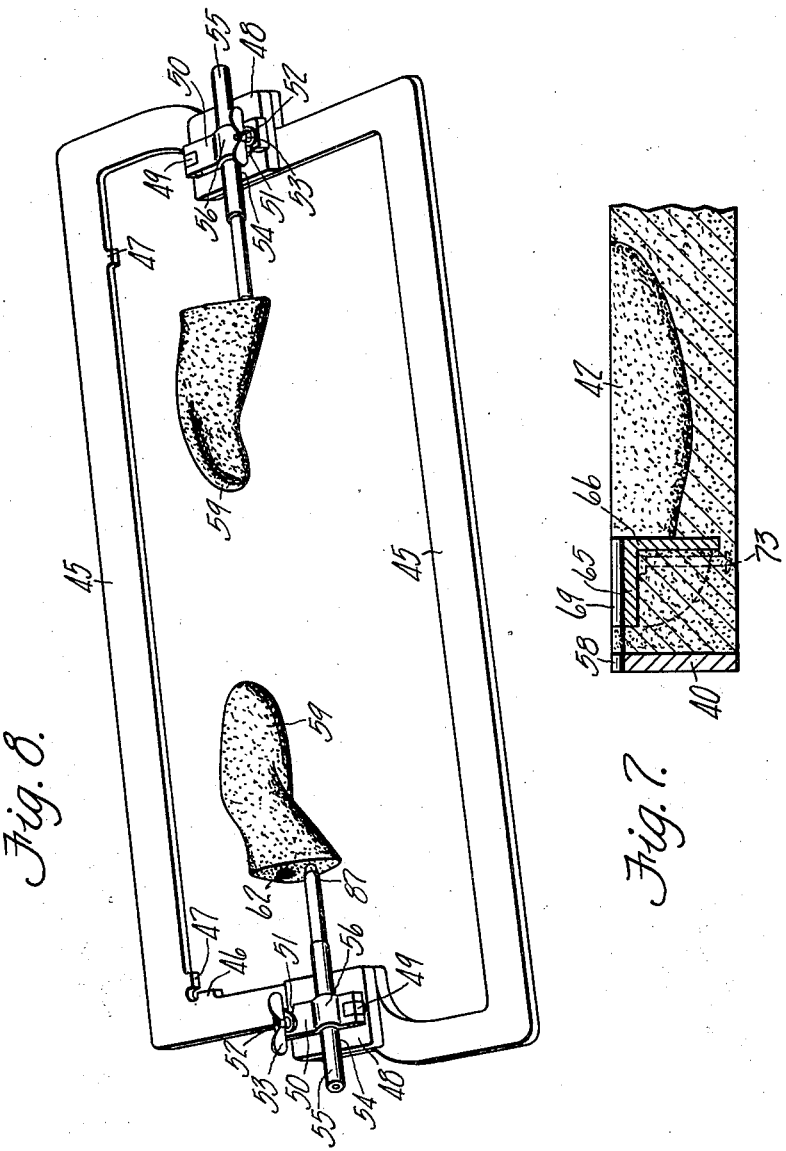
INVENTOR.
George C. Clark.
BY
ATTORNEY.

March 19, 1935.   G. C. CLARK   1,994,571
APPARATUS FOR MOLDING SECTIONS OF AN ARTICULATED MEMBER
Filed Feb. 3, 1934   5 Sheets-Sheet 5

INVENTOR.
George C. Clark.
BY
ATTORNEY.

Patented Mar. 19, 1935

1,994,571

UNITED STATES PATENT OFFICE 1,994,571

APPARATUS FOR MOLDING SECTIONS OF AN ARTICULATED MEMBER

George C. Clark, Beverly Hills, Calif.

Application February 3, 1934, Serial No. 709,586

7 Claims. (Cl. 22—126)

The invention relates to apparatus for molding sections of an articulated member, and particularly to apparatus for molding the sections of a hollow metal member to be pivotally connected, such as shoe lasts having toe and heel portions pivotally interconnected and used in the manufacture of leather footwear.

Heretofore the articulated shoe lasts for this purpose have been largely made of wood, due to the great difficulty and expense attendant upon the manufacture of jointed hollow metal lasts by machining methods. Another difficulty experienced was that, in finishing a section of an articulated last made of cast metal, the lack of a finished portion thereof from which the balance of the finishing can be done by machine resulted in lack of uniformity of the finished product and of the complementary sections of the last.

By the present invention these difficulties and objections are overcome by molding the joint surfaces of the last sections on a chill to eliminate the necessity of finishing said surfaces. The provision of the finished surfaces in the molding operation eliminates the expense of machining them, provides a portion from which the work of machining or finishing the balance of the last section may be guided, and insures uniformity of the product and proper relationship of the parts of the last.

Another feature of the invention resides in casting in one of the last sections, concurrently with the molding thereof and in exact predetermined relation thereto, a pocket or recess for a spring and ball employed in the hinge lock construction. By this feature uniformity and precision of joint construction is obtained, and the operation of machining a pocket, with resultant waste of material, is eliminated.

While the above statements have been largely directed to the invention as applied to the manufacture of shoe lasts, the invention is not limited thereto, but may be employed in the manufacture of any metal article formed of articulated sections.

The primary object of the invention is to provide means for molding a section of an articulated metal member with a finished joint surface.

A further object is to provide a molding apparatus with a chill forming a part of the mold impression.

A further object is to provide molding apparatus with a chill shaped to permit the arbor of a mold core to extend therethrough.

A further object is to provide a chill as part of the mold impression, said chill being of a form whereby it will serve to form the joint face of the member to be produced for all variations in size and form thereof, thus obviating the otherwise costly practice of employing a different chill for each of the multiplicity of last sizes and shapes necessary in the manufacture of footwear.

A further object is to provide means by which a section of an articulated hollow metal last may be molded with a tubular recess or pocket formed therein in precise relation to the hinge faces for the reception of means, such as a spring and ball, employed in connection with the lock of an articulated last.

A further object is to provide means by which an articulated hollow metal last may be inexpensively manufactured.

A further object is to provide means in a molding flask for precisely positioning a secondary core in operative relation to the mold impression of the flask and to the primary core mounted in said impression.

With the above and other objects in view, the invention resides in the combination and arrangements of parts as hereinafter set forth, shown in the drawings, described and claimed, it being understood that changes in the precise embodiment of the invention may be made within the scope of what is claimed without departing from the spirit of the invention.

In the drawings,

Figure 4 is a fragmentary perspective view of the drag of a molding apparatus for molding the toe portion of a hinged last.

Figure 5 is a fragmentary perspective view of the drag of a molding apparatus for molding the heel portion of a hinged last.

Figure 6 is a fragmentary perspective view of an assembled molding apparatus.

Figure 7 is a fragmentary transverse vertical sectional view taken on line 7—7 of Figure 4.

Figure 8 is a perspective view of the core supporting frame and cores.

Figure 1:
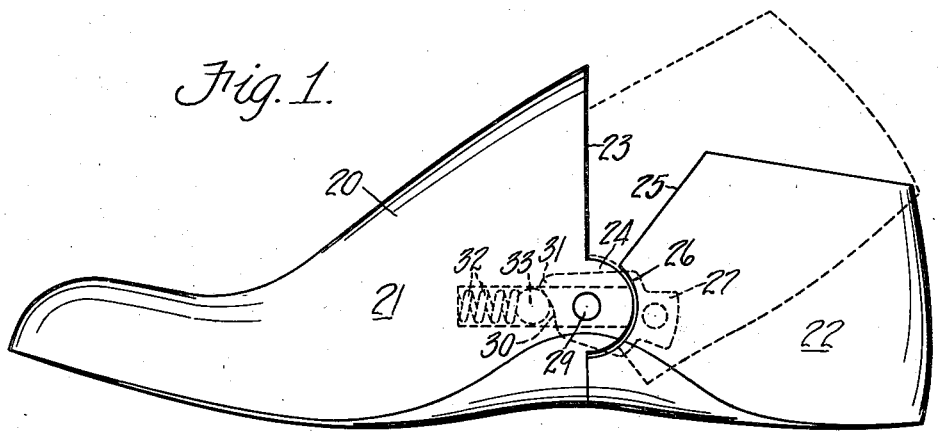
Figure 1 is a view in side elevation of the hinged last to be produced.
Figure 2:
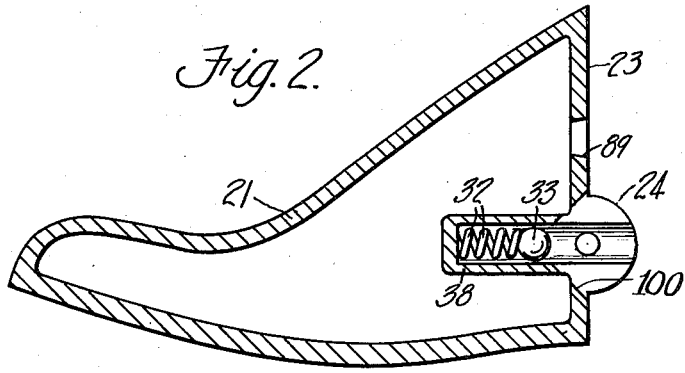
Figure 2 is a longitudinal vertical sectional view of the toe portion of the last.

Referring to the drawings, which illustrate the preferred embodiment of the invention, and particularly to Figures 1 and 2 thereof, the numeral 20 designates an articulated hollow metal last, preferably formed of aluminum, to provide novel means for the molding of which is the object of the invention. The last 20 is formed of a toe member 21 and a heel member 22. As illustrated, the joint face 23 of toe member 21 is provided with a transversely extending knuckle 24 which forms part of the hinge joint; and joint face 25 of heel member 22 is provided with a transversely extending recess 26 of a configuration complementary to knuckle 24 of the toe member, both of which are preferably of arcuate shape in cross section. A hinge lock plate 27 is imbedded in the heel member 22 in operative relation thereto and has an aperture 28 therein for the reception of a pivot pin 29 extending through a suitable transverse bore formed in toe member knuckle 24. Lock plate 27 tapers toward one end thereof which is provided with an edge cam face 30 of substantially ogee form and including a substantially arcuate projecting portion 31. A suitable longitudinal elongated open ended recess or pocket 38 extends forwardly in toe member 21 from and through the knuckle 24 and receives a spring 32 which urges a ball 33 against cam face 30 of plate 27 which is received in a suitable slot or kerf 100 cut in wall 23, knuckle 24 and pocket 38 of the toe member to extend transversely of the axis of said knuckle, and forms a lock which acts to hold the last members at either of the two extremes of their pivotal movement with ball 33 engaging plate 27 on the corresponding side of projecting portion 31 of said plate. The end of said plate 27 opposite cam 30 is provided with a narrow projecting portion 34 whose opposite sides 35 taper toward plate aperture 28, and said portion 34 has an aperture 36 formed therein. The heel portion 22 of the last is formed to provide a rearwardly projecting portion which completely encases the portion of plate 27 extending into said last member, the tapered edges of said member and the metal of the last which lodges in plate aperture 36 serving to solidly and securely anchor the plate 27 in the heel member 22.

The means for molding the sections of the articulated last illustrated, or the sections of any other desired articulated metal member, utilize the constructions illustrated in my patents, Nos. 1,210,420 and 1,210,421, and include a conventional flask comprising a drag 40 and a cope 41. The flask sections are filled with sand in which complementary mold impressions 42 are formed in any suitable manner. The drag and cope members 40 and 41 carry complementary projections 43 which are adapted by suitable pin and aperture interengagement to exactly position and register the flask members.

The drag member 40 has a pair of longitudinally extending ribs 44 formed at opposite sides thereof, and these ribs serve to support a core frame 45. The core frame 45 carries a bearing portion 46 projecting inwardly from one end portion thereof for engagement with the end of the drag, and also carries spaced bearing portions 47 projecting inwardly from one side thereof for engagement with one side wall of the drag adjacent the opposite ends thereof. When the bearing portions 46 and 47 are positioned in engagement with the side walls of the drag, the position of the frame relative to the flask is positive and correct, and said bearings form simple means for positioning the frame in each application thereof to the flask.

The end portions of the frame 45 carry blocks 48 at their center, and the upper faces of these blocks preferably lie flush with the upper edge of the drag. To each block is pivoted an upwardly extending lug 49 whose axis of rotation is vertical. To this lug 49 is pivoted, about an axis transverse of the pivotal axis of lug 49, one end of a plate 50. The opposite end of plate 50 is provided with an open-ended slot 51 through which locking means carried by block 48 and including a bolt 52 may extend. A thumb nut 53 adapted to bear on plate 50 is threaded on bolt 52. An elongated groove 54 of semi-circular cross section and extending parallel to the sides of frame 45 is formed in the center of the upper face of block 48 for the reception of a core arbor 55. The plate 50 is provided with a central off-set 56 for engagement with said arbor 55 when plate 50 is clamped in operative position against said arbor to positively position the same relative to the frame. It will be understood that the positioning of the arbor clamps at the ends of frame 45 as described is merely illustrative, and that they may be positioned at any point on the frame desired, as for instance at the enlarged portions 57 of the frame illustrated in Figure 3 for use in molding the heel portion of the last.

The arbor 55 extends inwardly of the frame through registering recesses 58 formed in the drag and cope and carries a suitable core member 59 at its end. The core 59 is positioned in precise spaced relation in the mold impression 42 to provide an opening into which the metal may flow through the pouring opening 60 and facilitated by a vent opening 61 formed in the cope to provide last walls of uniform thickness throughout. The core member 59 is shaped to accommodate the contour of the joint face of the member to be molded, and is provided with a recess or pocket 62 extending longitudinally from the joint face forming portion thereof to form a mold in which pocket 38 of the toe member is molded.

Figure 9:
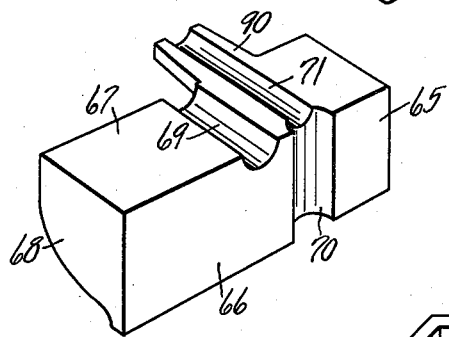
Figure 9 is a top front perspective view of the chill employed in molding the toe portion of the last.
Figure 10:
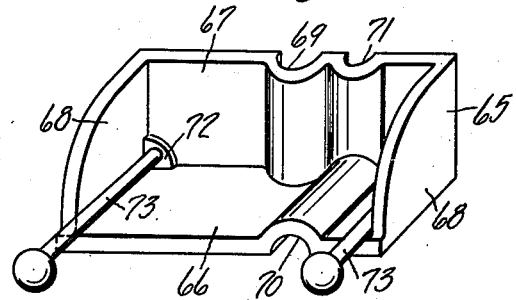
Figure 10 is a rear bottom perspective view of a modified form of chill for molding the last toe portion.

Mounted in each section of the flask is a chill 65, preferably formed of cast iron, the chills of the complementary sections of the flask being positioned in registration and forming a portion of the contour of the mold 42, i. e. the joint face thereof. The chill for forming the knuckle joint face, which is illustrated as being formed on the toe member of the last, is best illustrated in Figures 9 and 10. This chill comprises a vertical side plate 66 and a horizontal plate 67, said plate portions being reinforced by webs 68 extending therebetween at opposite ends thereof. In the center of plate portion 67 is formed a transverse recess 69 of semi-circular cross section. A transverse recess 70 of semi-circular cross section is formed in plate portion 66 in off-set relation to recess 69, said recess 70 forming the knuckle 24 of the toe member of the last. Another recess 71 of semi-circular cross section whose axis lies in the same plane as the axis of recess 70 and parallel to the axis of recess 69 is formed in plate face 67 for purposes to be hereinafter described, said recess 71 being smaller than recess 70. Bosses 72 are formed at the under side of plate portion 67 at the opposite corners formed by said plate portion, plate 66 and webs 68, and bolts 73 are threaded into said bosses. The chills are imbedded in the sand which is packed tightly in the drag and cope of the flask and are held in position by said sand. The bolts 73, which are also imbedded in the sand, serve as additional anchoring means for the chills. In the form of the chill shown in Figure 9, a projection 90 is formed in horizontal plate 67 in which recess 71 is extended to elongate said recess.

Figure 11:
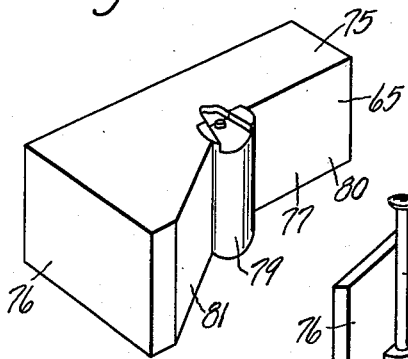
Figure 11 is a top front perspective view of the chill employed in molding the heel portion of the last.
Figure 12:
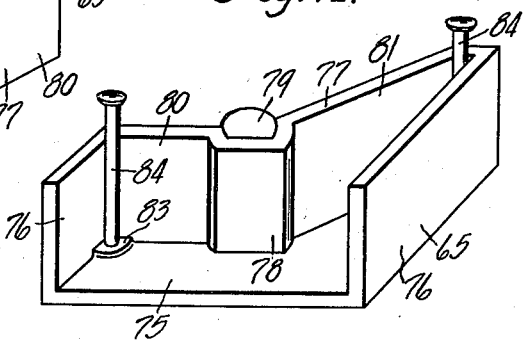
Figure 12 is a rear bottom perspective view of the chill shown in Figure 11.

The chills which form the recessed joint face on the heel member of the last comprise, as illustrated in Figures 11 and 12, a horizontal plate 75 from whose ends project perpendicular webs 76. A vertical plate 77 projects from said plate 75 and has an enlargement 78 formed centrally in the back and extending transversely thereof. In this enlargement is formed a recess which receives a plug 79 fixedly inserted therein to form the recess 26 in the joint face of the toe member of the last. From this enlargement one portion 80 of plate 77 extends perpendicularly to webs 76, and the other portion 81 extends in acute angled relation to said webs. Bosses 83 are formed on the bottom of plate 75 at the opposite ends thereof and adjacent plate 77 into which bolts 84 are threaded, these bolts serving as means to additionally anchor the chill in the sand in which the chill is imbedded in the same manner as previously set forth.

Figure 3:
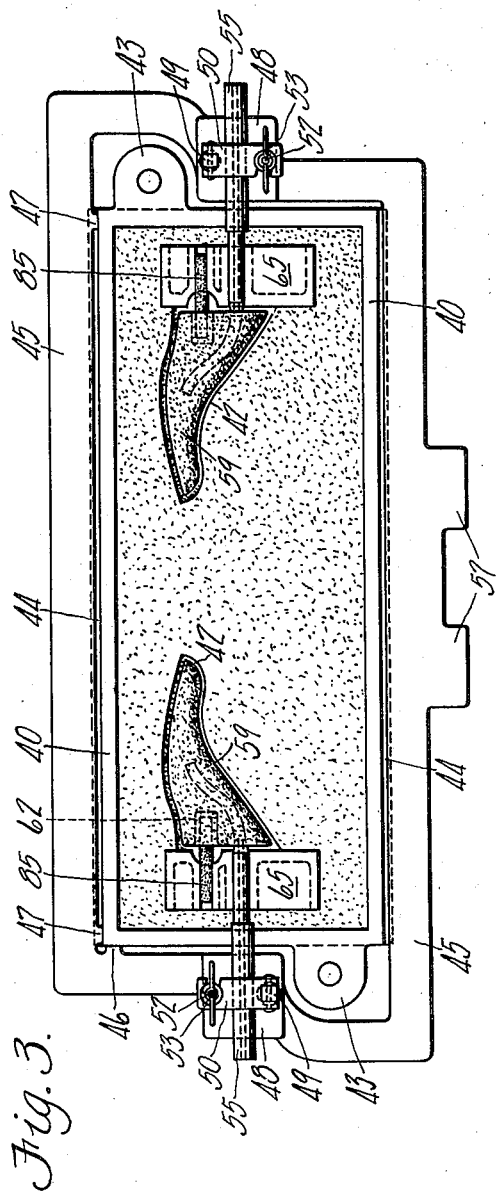
Figure 3 is a top plan view of the drag, core, and core supporting frame of a mold apparatus.
Figures 13, 14:
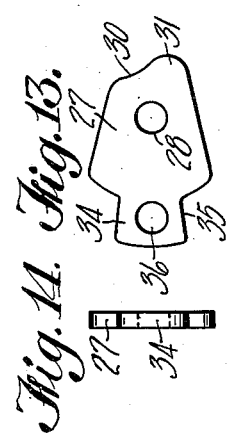
Figures 13 and 14 illustrate the hinge lock plate in plan and end elevations, respectively.

In the use of the apparatus, the sand in the drag and cope of the flasks for molding the toe and heel members 21 and 22 of the last are provided, in any usual or desired manner, with a mold impression 42 positioned to have one face thereof formed by one of the chills 65. The frame 45 has the arbors 55 of the cores 59 clamped thereto in operative position, and is mounted upon the ribs 44 of the drag with its bearings 46 and 47 engaging the drag to insure correct positioning thereof and of the cores 59. The core arbors 55 rest in the recesses 69 of the chills, in the case of the toe member flask, and in the recesses 58 of the drag and cope of the flask. An elongated cylindrical sand core 85, illustrated in Figure 3, is then placed in the recess 71 of the chill of the drag in the flask forming the toe member to project into the recess 62 of core 59, said chill having its recess 71 of sufficient length, as obtained in the construction illustrated in Figure 9 for example, to properly support said core 85. The cope is then mounted on the drag in registering relation thereto and the metal is poured into the mold 42 through cope opening 60, the molten metal filling the mold impression and the pocket shaped recess formed by core 85 and recess 62 of core 59. The cores 59 and 85 are made of sand which dries from the heat of the molten metal and passes through the opening in the molded article, in the case of core 59, left by the arbor 55 upon removal thereof, said arbor being tapered at 87 to facilitate removal thereof from the molded article, as is conventional in the art. The arbors 55 are so positioned, as at the joint face of the mold in the case of the toe member and at the top in the case of the heel member, that the openings, as opening 89 in the toe member, left by their removal from the finished mold need not be plugged. The metal which is cast against the chills assumes a finished surface and does not require machining.

It will thus be seen that this apparatus enables the joint faces of the sections of a hinged member to be cast in finished form, while at the same time giving the same wide application that is obtained from the use of a sand mold with respect to the infinite variations in shape and size of the article to be cast that may be obtained. The chills are of a size large enough to permit lasts of any size or shape to be molded thereagainst by merely changing the impression formed in the sand of the flask. Likewise, the finishing of the joint faces gives a starting point relative to which the finishing of the balance of the last member can be done with assurance that the result for each individual section will correspond uniformly with that of the others. Also the provision of the chills 65 with means for positively positioning the core 85 which cooperates with recess 62 of core 59 to form the pocket 38 in the toe member in precise relation to knuckle 24 insures uniformity and provides an inexpensive method of forming said pocket and eliminates expensive machining. Another advantage obtained is the simplicity and inexpensive character of the apparatus which only requires the use of one set of chills in addition to the usual means for molding hollow metal articles, and does not require separate chills or forms for each individual article to be molded irrespective of its shape or size.

The invention having been set forth, what is claimed as new and useful is:

1. The combination with a flask for molding a section of an articulated shoe last and comprising a drag and a cope, a core, means for accurately positioning said core in said flask including an arbor, formable material disposed in said drag and said cope, of a two part chill having a parting plane, said drag and cope each having complementary mold impressions formed in the formable material thereof and a chill part imbedded in said formable material, said chills forming one face of the mold impression of said flask against which the joint face of the section of said articulated shoe last is molded, each chill having on said face thereof a curved offset, said offsets being axially aligned to cast a joint accommodating portion of said last part, said chills having complementary recesses formed in the parting faces thereof in spaced relation to and substantially perpendicular to said offset through which said core arbor extends to precisely position said core in the mold impression of said flask.

2. The combination with a two-part molding flask having a mold impression for molding a section of an articulated shoe last, a core, means for accurately positioning said core in said mold impression including an arbor, of a two-part chill having a parting plane, one part of said chill being mounted in each part of said flask, said chill parts cooperating to form the joint face of said mold impression and each having on the impression forming face thereof a curved offset, said offsets registering when the flask and chill parts are assembled, said chills having registering recesses formed in the parting faces thereof through which said core arbor extends.

3. In a molding apparatus for molding a hollow metal member, a molding flask having a mold impression formed therein, a metal member carried by said flask adjacent said impression, a core mounted in said impression and having a recess formed therein, and a second core carried by said metal member and extending into said recess in spaced relation to the faces thereof to provide the article to be molded with a pocket.

4. In a molding apparatus for molding a hollow metal last part, a molding flask having a mold impression formed therein, a chill carried by said flask to form the joint face of said mold impression, the face-forming portion of said chill having a groove of arcuate section formed therein, a core mounted in said mold impression and having a pocket formed therein, said chill having an opening formed therein whose axis extends perpendicularly to and intersects the axis of said groove, and a member mounted in said chill opening and projecting into said core pocket in spaced relation to the walls thereof, whereby the molded last part is provided with a finished joint face having a projection of arcuate section and an open ended interior pocket partially formed in said projection.

5. In a molding apparatus for molding a hollow metal last part, a molding flask having a mold impression formed therein, a two-part chill carried by said flask to form the joint face of said mold impression, the face-forming portions of said chill each having a groove of arcuate section formed therein, said chill parts having two pairs of registering grooves formed therein, one pair of registering grooves communicating with said first grooves and extending perpendicularly thereto, a core mounted in said last named registering grooves and extending into said mold impression, an arbor extending through the other registering grooves, a second core mounted on said arbor and positioned in said mold impression, said second core having a recess therein into which said first core partially extends in spaced relation to the walls thereof whereby said recess and said first core mold an interior pocket in said last part.

6. A chill for casting the joint face of an articulated hollow shoe last part, comprising a pair of parts having a parting plane and a casting surface, said casting surface including a curved offset on each chill part, said offsets registering when said chill parts are operatively positioned, the parting faces of said chills having registering recesses formed therein adapted to accommodate an arbor mounting a core molding the interior of said article.

7. A chill for casting the joint face of an articulated shoe last part, comprising a pair of parts having a parting plane and a casting surface, said casting surface including a curved offset on each chill part, said offsets registering when said chill parts are operatively positioned to provide a joint accommodating portion of the joint face of the casting, the parting faces of said chills having registering recesses formed therein in intersecting relation to said offsets to accommodate a member forming a pocket in said casting opening at the joint face of the casting and at the joint accommodating portion thereof.

GEORGE C. CLARK.